(12) United States Patent
VanLente (10) Patent No.: US 9,210,846 B2
(45) Date of Patent: Dec. 15, 2015

(54) VERTICAL CONCENTRATED VEGETABLE AND PLANT GROWER

(71) Applicant: Joseph P. VanLente, North Muskegon, MI (US)

(72) Inventor: Joseph P. VanLente, North Muskegon, MI (US)

( * ) Notice: Subject to any disclaimer, the term of this patent is extended or adjusted under 35 U.S.C. 154(b) by 326 days.

(21) Appl. No.: 13/771,874

(22) Filed: Feb. 20, 2013

(65) Prior Publication Data

US 2013/0219788 A1   Aug. 29, 2013

Related U.S. Application Data

(60) Provisional application No. 61/604,197, filed on Feb. 28, 2012.

(51) Int. Cl.
*A01G 9/02* (2006.01)
*A01G 31/02* (2006.01)

(52) U.S. Cl.
CPC ............... *A01G 9/022* (2013.01); *A01G 9/025* (2013.01); *A01G 31/02* (2013.01)

(58) Field of Classification Search
CPC ......... A01G 7/00; A01G 9/022; A01G 9/023; A01G 9/024; A01G 9/025; A01G 1/005; A01G 1/007; A01G 31/045
USPC ............................. 47/83, 82, 65.7, 62 R, 62 A
See application file for complete search history.

(56) References Cited

U.S. PATENT DOCUMENTS

| | | | |
|---|---|---|---|
| 1,993,631 A * | 3/1935 | Smith | 47/83 |
| 2,911,794 A | 11/1959 | Pearson | |
| 3,394,495 A * | 7/1968 | Mills | 47/83 |
| 4,033,072 A | 7/1977 | Kobayashi et al. | |
| 4,135,330 A | 1/1979 | Aoyama | |
| 4,161,085 A | 7/1979 | Moffett, Jr. | |
| 4,295,296 A * | 10/1981 | Kinghorn | 47/82 |
| 4,380,136 A * | 4/1983 | Karpisek | 47/83 |
| 4,419,843 A * | 12/1983 | Johnson, Sr. | 47/82 |
| 4,665,647 A | 5/1987 | Behrens et al. | |
| 4,785,577 A | 11/1988 | Lederbauer | |
| 4,961,284 A | 10/1990 | Williams | |
| 5,031,359 A * | 7/1991 | Moffett, Jr. | 47/83 |
| 5,257,476 A | 11/1993 | Fukuzumi | |
| 5,363,594 A * | 11/1994 | Davis | 47/82 |
| 5,381,625 A * | 1/1995 | Wente | 47/83 |
| 5,390,442 A | 2/1995 | Behrens | |
| 5,555,676 A * | 9/1996 | Lund | 47/82 |
| 5,579,603 A | 12/1996 | Fukuzumi | |
| 5,658,096 A | 8/1997 | Von Kanel | |
| 6,021,602 A * | 2/2000 | Orsi | 47/62 A |

(Continued)

*Primary Examiner* — Monica Williams
*Assistant Examiner* — Michael Wang
(74) *Attorney, Agent, or Firm* — Price Heneveld LLP (57) ABSTRACT

A vertical gardening system includes at least one sheet of geosynthetic material hung generally vertically, and forming vertical channels extending top to bottom of the sheet on a rear side and including a plurality of small upwardly-open individual pockets on a front side and growing medium on both sides of the at least one sheet and located in both the channels and the pockets. A related method includes providing a portable stand and supporting on the stand a sheet with vertical channels and pockets as defined above, growing plants in the pockets with their roots extending into the channels, and moving the stand to promote plant growth, including one of moving the stand to orient the plants toward sunlight during daylight, or moving the stand between a first location of optimal sunlight and a second location of optimal protection against freezing.

27 Claims, 9 Drawing Sheets

(56) References Cited

U.S. PATENT DOCUMENTS

| | | | |
|---|---|---|---|
| 6,058,651 A * | 5/2000 | Perez | 47/65.8 |
| 6,293,045 B1 | 9/2001 | Morgan | |
| 6,408,570 B1 * | 6/2002 | Shih et al. | 47/79 |
| 6,615,542 B2 * | 9/2003 | Ware | 47/83 |
| 7,596,906 B2 | 10/2009 | Gold | |
| 7,627,983 B1 * | 12/2009 | Deutsch-Aboulmahassine | 47/83 |
| 7,703,239 B2 | 4/2010 | Steele | |
| 7,814,703 B2 | 10/2010 | Irwin | |
| 7,818,919 B1 | 10/2010 | Maxwell-Merrill et al. | |
| 7,921,599 B2 | 4/2011 | Irwin | |
| 8,122,642 B1 * | 2/2012 | Huberman et al. | 47/59 S |
| 8,141,294 B2 * | 3/2012 | Bribach et al. | 47/83 |
| 8,181,391 B1 * | 5/2012 | Giacomantonio | 47/62 R |
| 8,776,433 B2 * | 7/2014 | Huang et al. | 47/82 |
| 2008/0110086 A1 * | 5/2008 | Julia | 47/64 |
| 2008/0155894 A1 | 7/2008 | Bissonnette et al. | |
| 2009/0223126 A1 * | 9/2009 | Garner et al. | 47/66.7 |
| 2011/0059518 A1 | 3/2011 | Bribach et al. | |
| 2011/0094153 A1 | 4/2011 | Urriola | |
| 2011/0258925 A1 * | 10/2011 | Baker | 47/65.8 |
| 2011/0302837 A1 * | 12/2011 | Chen | 47/65.8 |
| 2012/0066972 A1 * | 3/2012 | Lin | 47/82 |
| 2013/0061521 A1 * | 3/2013 | Cudmore | 47/83 |
| 2013/0212940 A1 * | 8/2013 | Blyden | 47/65.8 |
| 2013/0340337 A1 * | 12/2013 | Kuo et al. | 47/82 |
| 2014/0109473 A1 * | 4/2014 | Sung | 47/39 |
| 2014/0115959 A1 * | 5/2014 | Carroll et al. | 47/65.8 |
| 2014/0230325 A1 * | 8/2014 | Collis | 47/82 |

\* cited by examiner

VERTICAL CONCENTRATED VEGETABLE AND PLANT GROWER

This application claims benefit under 35 USC §119(e) of provisional application Ser. No. 61/604,197, filed Feb. 28, 2012, entitled CONCENTRATED VEGETABLE GROWER the entire contents of which are incorporated herein by reference

TECHNICAL FIELD

The invention relates to a system for concentrated growing of a variety of vegetables and plants. More specifically, the invention relates to a system that is vertically suspended for concentrated growing of a variety of vegetables and plants out of doors.

BACKGROUND

In order to achieve cost effective concentrated growing of vegetables ideal conditions must exist in limited space at low over all cost. Beyond the obvious advantages of growing vertically, ideal conditions must be achieved in areas of aerated growing medium, efficient watering and providing growing nutrients. Historically, with vertical gardening, providing light weight, loose non-compacting high drainage aerated growing medium for adequate water distribution resulted in a growing medium that provided poor root anchorage. In this scenario, short plant variety of vegetables (beans, broccoli) can lose root anchorage when heavy with abundant produce, particularly in a vertical application where the plant has more exposure to wind. The need to address the wind issue is highlighted by changes in sign ordinances requiring rigid plastic signs to be replaced with vinyl materials.

Additionally, there are difficulties in achieving a balance of water distribution and aeration, particularly when utilizing loose non-compacting growing medium and geosynthetics/geotextiles. A variety of different arrangements have been tried. Though geotextiles are commonly used in agriculture, and in soil stabilization and suspended growing in small quantities, there is a need for further improvements in order to achieve vertical concentrated gardening while maintaining optimal water utilization and uniform/balanced distribution. This balance of optimal water utilization and distribution has not been achieved due to a variety of problems with poor designs. At least part of the reason for the poor designs is because known designers apparently do not fully appreciate and design for the difference in water flow specification of geosynthetics in the areas of filtering vs. drainage. Specifically, filtering considerations use a first set of liquid flow calculations/formulas and flow pressure/resistances, while drainage considerations use a very different set of calculations/formulas and flow pressure/resistances. The use of geosynthetics for vertical gardening is more of a drainage application, not a filtering application, thus different principles of water flow apply. As a result, many existing designs incorporate wrong (or at least significantly less than optimized and/or very inefficient) product characteristics and features, and use incorrect growth media, resulting in water inflow rates and water retention rates that are not well-suited for optimal plant growth. This concept is further discussed below.

SUMMARY OF THE INVENTION

Embodiments of the invention include improved designs for 1) water utilization, 2) improved plant performance through natural selection, 3) higher plant survival rate and higher produce yield in a vertical concentrated growing application, and 4) better root anchorage as needed to support a concentration of short plant variety of vegetables against wind, are heavy with produce, and growing in a vertical application. The concentrated growing system combines aeroponic, geoponic and hydroponic approaches using a geosynthetic material fabricated to form continuous vertical closed growing channels. These growing channels house the growing medium. The channels are fastened to and supported by an impermeable ripstop polyester scrim reinforced vinyl membrane. Strips of geosynthetic material are sewn on a front of the sheet horizontally to form envelopes (also called "individual pockets" herein) that are spaced vertically to the face side of the closed growing channels, the envelopes function as a seed bed or seedling nursery on a front of the sheet. As many as six seeds or seedlings are planted in the envelope.

In the present innovation, plants are allowed to grow from six to eight inches before thinning. Notably, this is markedly different than the customary practice of growers, which is to thin at a one inch plant height. Part of the reason for this change is that, in the present innovation, the roots of the seedlings must penetrate the geotextile housing and pass through into the growing medium to progress. Thus, by natural selection, the plants that have aggressive root development and osmotic root pressure capacity needed for high yield, penetrate this barrier and grow faster. In addition to providing root anchorage for later plant development, the present design acts as a screening process allowing smaller plants to be thinned out. An additional important feature is that the plant thinning process does not disturb the roots of the remaining plants as they are embedded into the housing of the growing channel. The bottom of each growing channel can be opened to facilitate growing medium rejuvenation and replacement.

A significant aspect of the present innovation is the understanding that water flow rates of geosynthetics are different when the water flows perpendicularly through the geosynthetic (called a "filtering application" herein) and when the water flows parallel the sheet as a plane (called a "drainage application" herein). It is noted that water flow rates of geosynthetics are typically specified in a filtering application where water flow is perpendicularly through the geosynthetic sheet. This data is different and in fact negatively correlated to flowing water on/in the geosynthetic in a direction parallel the sheet. For example, in a filtering application (i.e. "water flow perpendicular to the sheet"), material of higher mil thickness will show a slower flow rate perpendicularly through the sheet. Contrastingly, in a drainage application (i.e. "water flow parallel to the sheet"), the material of higher mil thickness will show a higher flow rate through the sheet. In other words, in "drainage applications", the thicker material will have increased flow because the volume of the plane (i.e. thickness of the sheet) is increased. In "drainage applications", thinner material will have a reduced flow since the volume of the plane is decreased. Therefore, for optimal water utilization, the concentrated grower using the present innovation utilizes material that is selected based on its drain application (capacity), not on a filtering specification. Notably, I believe this is a common mistake in previous designs incorporating geotextiles for vertical growing. See the illustration provided from the third addition of Geotextiles and Geomembranes. Definitions, Properties and Design, by the IFAI 1984, 1985. My testing suggests that water permeability rates have less variation between standard mil thickness than one might think. The misunderstanding and misapplication of this principle is obvious in recent designs where mechanical devices are provided for drainage and where illustrations show drainage is occurring through the fabric. This is a problem because too much drainage results in excess water usage, excess electric utility expense, the requirement of a more expensive water supply and recycling system, poor water distribution, and plant failure. Thus, a proper design that accounts for "drainage application" is necessary to cost effectively growing vegetables.

Another feature of the present innovation, resulting from incorporating drainage application of geotextiles, is compatibility with drip watering systems common to the green house industry and residential gardening. Different rates of water can be dispensed into the top of the growing channel to accommodate different growing mediums. This area can be used for dry plant foods and fertilizers. No systems for liquid chemical plant foods need to be incorporated, but are easily applied if desired for commercial growing. Water distribution is achieved as the excess water overflow at the top of the growing channel moves slowly through the geotextile housing. In addition to topical watering, this supplies water and nutrients to all sides of the growing channel and saturates the growing medium with minimal run off. Continual watering typical of hydroponic systems is not required once the growing medium is saturated. Aeration is provided as the geotextile is made of felted fibers that are nonwoven and non-absorbing.

Embodiments of the invention also include an adequate system for suspension. The growing channels are fastened to an impermeable membrane of vinyl material laminated over a ripstop polyester scrim. A variety of fasteners are installed in various areas to facilitate variable installations.

Embodiments of the invention also include an additional strip of reinforced vinyl laminate material that can be utilized in the aid of suspension, and that provides housing and fasteners for water delivery and distribution.

Embodiments of the invention also facilitate easy removal and replacement of the growing medium using fasteners for open and closing the growing channels ends.

In one aspect of the present invention, a gardening system using materials selected from hydroponic, aeroponic, and geoponic materials for concentrated growing of vegetables in a vertical or near vertical arrangement, comprises geo engineered and industrial first fabrics forming a plurality of continual vertical root-growing channels filled with a growing medium; and additional engineered and industrial second fabric forming envelopes on a front of the channels, the envelopes functioning as a seed germination and seedling nursery fixed horizontally across and spaced vertically apart on a front side of each of the growing channels.

In another aspect of the present invention, a vertical gardening system includes at least one sheet of geosynthetic material hung generally vertically, and forming vertical channels extending top to bottom of the sheet on a rear side and including a plurality of small upwardly-open individual pockets on a front side and growing medium on both sides of the at least one sheet and located in both the channels and the pockets.

In yet another aspect of the present invention, a method includes providing a stand and supporting on the stand at least one sheet of geosynthetic material hung generally vertically and forming vertical channels on one side and pockets on another side both filled with growing medium; growing plants having an above-ground portion extending above the pockets and roots extending from the pockets into the channels; and moving the stand to promote plant growth, including one of moving the stand to orient the plants toward sunlight during daylight, or moving the stand between a first location of optimal sunlight and a second location of optimal protection against freezing.

In still another aspect of the present invention, a method includes providing a stand and supporting on the stand at least one sheet of geosynthetic material hung generally vertically and forming vertical channels on one side and pockets on another side both filled with used growing medium; growing plants having an above-ground portion extending above the pockets and roots extending from the pockets into the channels; and replacing the growing medium by opening a bottom of the channels to dump the used growing media, closing the bottom, and then automatically passing new growing media into a top of each of the channels.

DESCRIPTION OF THE INVENTION

A illustrated innovative vertical growing system 100 (FIGS. 1-3) resolves several problems for growing concentrations of vegetables and other plants in limited spaces and/or out of doors. For example, the present system will support growing short heavy plants, such as broccoli, cauliflower, peppers, and the like in a very dense array. However, it is contemplated that a scope of the present innovative includes modifications to the present system adapting it for use in growing a wide variety of different plants, including a wide variety of different vegetables, flowering and non-flowering plants, and organisms requiring growth media.

Figure 1:
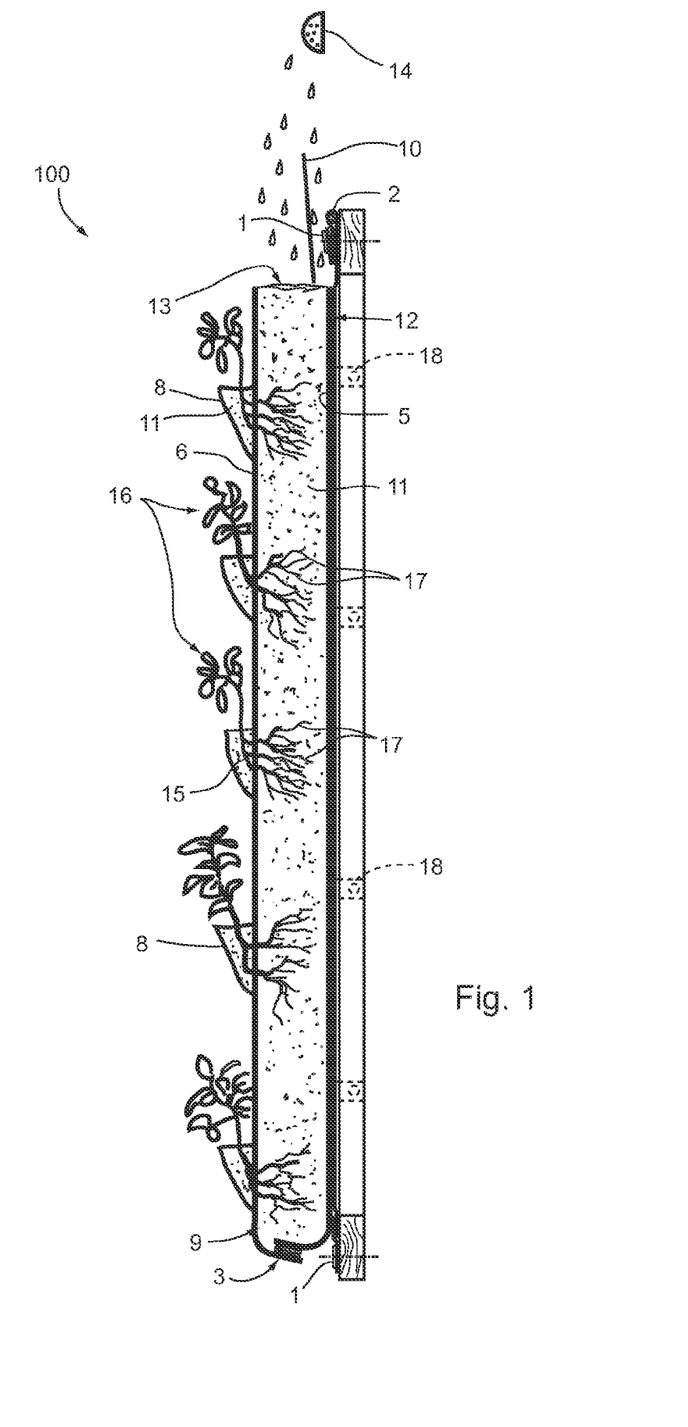
FIG. 1 is a vertical cross section in a side view detailing a system incorporating the present innovation, the system being optimal for plant development and support and root anchorage as needed for concentrated growing of garden vegetables in a out of doors vertical application.
Figure 2:
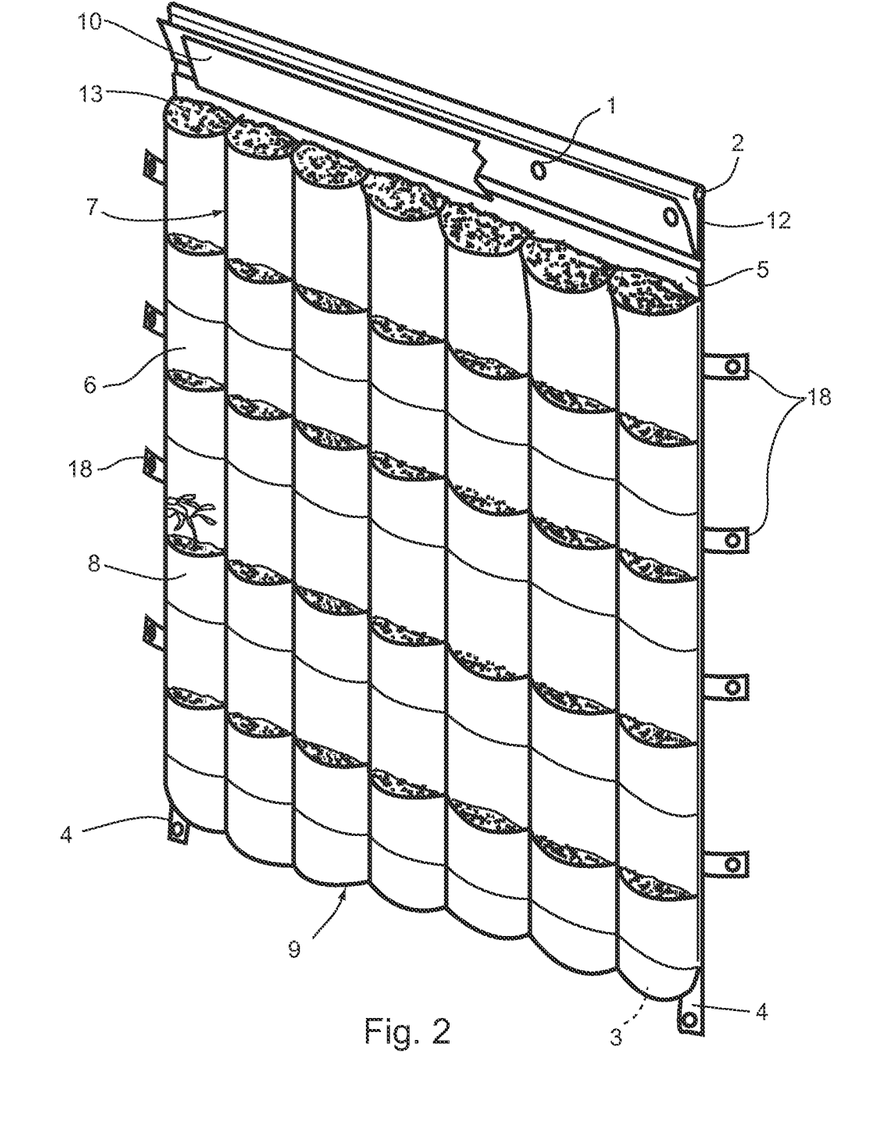
FIG. 2 is a perspective view of FIG. 1, and illustrates the assembled components for concentrated growing of garden vegetables out of doors.
Figure 3:
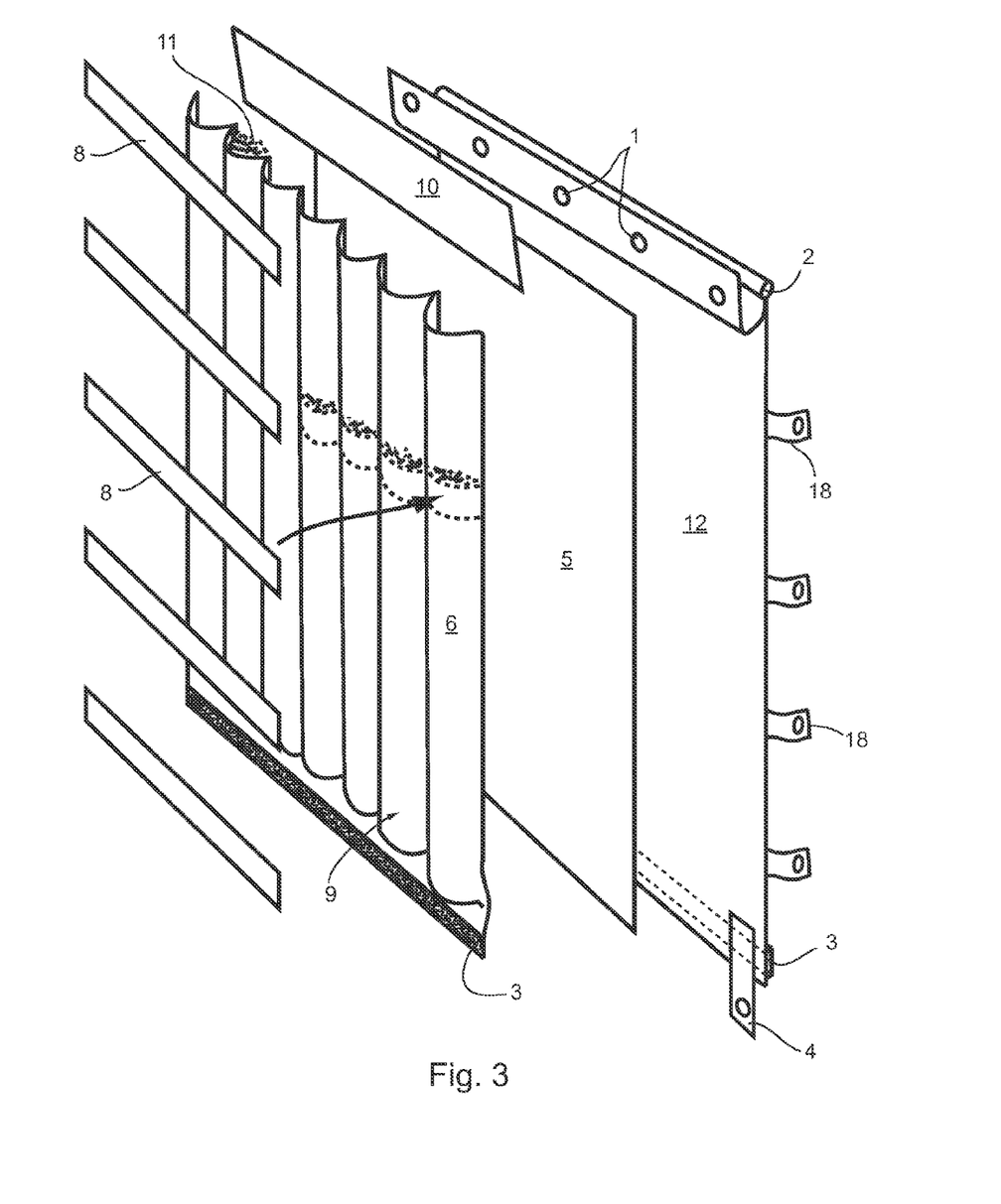
FIG. 3 is an exploded perspective view of FIG. 2, and illustrates the separate components in consecutive layers for a system for concentrated growing of garden vegetables out of doors.

My testing of the illustrated present system 100 has shown it to be a significant improvement beyond any known vertical application/system for at least the following reasons. The system described herein is lightweight, affordable, and easy to install in a variety of vertical (and slightly-angled) semi-vertical surfaces. Fabricated from materials engineered for soil stabilization, water filtering and drainage, the system (including all components) will remain strong and durable over time, making it a cost effective investment. The primary components are lightweight fabrics that can be folded or rolled to accommodate handling, shipping and storage. Seeds or transplanted seedlings start in an array of forward-and-upwardly-open envelope-shaped pockets of geosynthetic fabric containing growing medium. Roots of the plants grow through the geosynthetic material rearwardly into vertical channels of growing medium located behind the pockets. The vertical channels house a variety of non-compacting potting soil or growing medium, and form continuous (continual) vertical channels top to bottom of the apparatus. Each continual channel, unlike the individual common pockets, facilitates uniform downward distribution of nutrients, provides vertical channels for organic growing and water flow, and provides adequate cubic space needed for a healthy root system critical for abundant vegetable yields.

In addition to providing aeration and creating an open vertical channel, the present arrangement of material in the present system 100 provides for excellent root anchorage, which is usually lacking in a non-compacting growing medium. Root anchorage is vital for supporting a vegetable plant in later yield stages when weight of produce (broccoli) combined with wind can cause the plant to loose root anchorage. In addition, the housing material acts as a moderate root barrier holding back plants with poor tap root production and osmotic root pressure capabilities. Using this natural selection, thinning of plants is postponed beyond the recommended one inch and does not damage the established roots of the remaining plants. For example, plants can be grown to a height of 3 to 8 inches before thinning, which is considered to be a tremendous advantage in selecting plants, since these larger plants better show their potential for growth and health and vegetable-bearing than the smaller 1 inch plants.

The illustrated channels are sewn to a vinyl reinforced laminated material backing. This provides strong support for suspending the system in the wind and prevents air passing through, thereby reducing evaporation and saving water. Features of the concentrated grower, as provided by the invention, will facilitate a wide range of green house and outdoor gardening applications where utilization of space is needed. This will also facilitate concentrated growing in existing outdoor areas such as parking lots, fences and sides of buildings, which structures are otherwise not suitable for conventional vegetable gardening.

FIG. 1 provides a perspective side view of how the seeds or seedlings transition from a seed or seedling geo material envelope 8 (also called "pockets"), into advanced stages of root development 17. A first watering system/watering shed 14 (also called a "water dripper" or "sprinkler" herein) applies moisture, which flows along the outer geo housing 6, through the growing medium in the growing chambers 13 and approaches the secondary watershed in the back layer 5 of the geo housing. In addition to providing water and nutrients, the front outer geo housing 6, composed of non-woven geotextile fabric, permits tap roots to become enmeshed and penetrate into the growing chamber providing root anchorage in housing 6 and 17. Protecting the hair roots 17 from detaching from the tap roots via root anchorage in locations 8 and 6 from high wind has become critical given past weather data of the last three decades recording increased wind velocity. This trend is reflected in the change of sign ordinances replacing rigid plastic with reinforced vinyl fabrics. It is contemplated that the present garden apparatuses will typically be approximately the size of a medium size sign, such as 6-8 feet wide and high, however it is noted that they can be different sizes and still be within a scope of the present inventive aspects.

Hook and Loop fasteners 3 at the bottom of each growing channel 9, along with the open channel at the top of growing chambers 13, allow for opened and closed function for changing growing mediums, which changes can be done manually or automatically with vacuum or air blown assist.

FIG. 2 provides a perspective view of the present innovative system 100. The present system is particularly designed for concentrated growing of vegetables. Beyond the common and obvious vertical arrangement, the present system is the first system that incorporates a designed-in balance in the aligning of agricultural concepts and needs for optimal plant growth with specifications in water flow rates of engineered non-woven geo fabrics. As noted above, historically, previous systems appear to apply the filter specification of geosynthetics for water distribution. However, as discussed above, selecting or choosing a fabric using the "filtering specification" would result in poor water utilization and distribution.

The illustrated embodiment/apparatus 100 of this invention incorporates the geo material in a drainage application. In a filtering application, water flow rates will specify lower volumes for thicker fabrics. But in a filtering application, this specification must be applied in reverse for water utilization. Quite simply, in a drain application, (water moving through a plain), the thicker mater will allow more, not less, volume than a thin geo material and vice versa. The thin material with a high water flow rate in a filtering application will allow less volume of water to move through in a plain or drainage application. Utilizing the right thickness of geo material 5 and 6 the water is presented to the opening created between layers of vinyl 10 and 12 to the top of the growing chamber medium 13. Overflow slowly moves to the outside of the top of the growing chamber 13 to the side geo material housing 5 and 6 and slowly moves downward. The growing medium becomes evenly saturated from the top 13 and both front and back 5 and 6.

Roots from the seedlings in the planting or seedling envelope 8 are attracted to the water shed in the front layer material 6 housing the chamber. Initially, as many as six seeds or seedlings can be planted in the nursery envelope 8. Utilizing plant intelligentsia and natural selection principals, the roots continue to grow through the geo material 6 into the growing chamber. The plants are allowed to grow to a height of 3 to 10 inches (or more preferably 6 to 8 inches) before thinning. This additional growth in height allows the grower to use natural selection of plants, since the plants in the present system grow to a height of as much as 6-8 inches, allowing the grower to more accurately interpret their genetic growth strength. In other words, if a plant is thinned at one inch height, the grower cannot tell for sure which plant is best kept and which is best thinned. Specifically, using the present system, dwarfed plants with slow root development are thinned later than the traditional one inch height.

A roped hem 2 with metal grommets 1 facilitates vertical support with through fastening. Bottom corner fasteners 4 are provided to stabilize the invention in the wind. Side tabs 18 are provided for fastening a support string horizontally across the front of the plants as is common with concentrated growing resulting in above average production. An analogy can be made to the fruit growing industry. While a goal is to increase trees from 250 trees per acre to 750, the true goal is to grow fruit, not trees. Thus, in concentrated growing, the branches require support when they become heavy with fruit. In the present case using the present system, the point is increase the number of vegetable plants, but the true goal is to grow more vegetables.

The present system 100 does that by providing improved selection (by allowing later thinning of plants) and by providing better support to the plants (to avoid pullout and root damage as the vegetables gain considerable weight). The top of the growing channel 13 is open, and the bottom of the growing channel 9 has a hook and loop fastening system to allow opening and closing. This facilitates convenient exchange of growing mediums. Notably, if desired, different growing mediums can be installed in different growing channels 6 to accommodate different plant varieties at the start of each growing season. In some systems, a lower area of the apparatus 100 (or 100A) will be slightly wetter than other regions of the apparatus, such that plants needing more water would tend to be planted lower, while plants needing less water would tend to be planted higher. Also, it is contemplated that some envelopes/pockets could be filled with growing media consistent with the plant contained therein. For example, perhaps more clay would be included in envelopes for plants that "like" clay (such as broccoli, while beans don't tend to like clay), and more nitrogen would be provided in some envelops for plants that "like" more nitrogen (such as broccoli, as compared to beans or peppers). As a side benefit, it is noted that a building wall having one of the apparatus 100 (or 100A) mounted thereon would be significantly cooler than the building wall exposed directly to sunlight, thus providing additional ecological benefits by using the present system. This can be particularly important in many hot and humid states such as New Mexico and Arizona, and in hot and humid countries, such as Mexico.

FIG. 3 provides a view of the separate components of the present system 100 as they are layered from right to left. The outer layer of geo material 6 is shown as it appears after it is fabricated by sewing along locations 7 (FIG. 2) and filled with a growing medium 13 (FIG. 2) forming channels. Soluble dry plant foods and non burning fertilizers 11 can be deposited at the top of the growing channel where water is deposited as a gravity feed design. Complicated liquid chemical plant food infusion systems are not required but can be incorporated for commercial purposes if desired. Notably, the fabric can be interconnected in ways other than sewing, such as by using hook-and-loop material (commonly referred to as Velcro®) or rivets. The illustrated bottom of the channels (FIGS. 1 and 3) are closed by hook-and-loop material. This permits each channel to be releasably opened to dump content in the channels. Thereafter, the channels are closed at the bottom, and growing media can be dumped into the open top of the channels. In particular, it is contemplated that the present system of removing "spent"/used growing media (and roots) can be removed automatically, such as by suction, and new/fresh growing media can be introduced into (e.g. blown into) each channel automatically, such as by an air or gravity convenience system. This allows for automated and efficient filling, which is particularly important in commercial applications.

Additional modifications to the present apparatus 100 and innovative aspects are described below using identical numbers for identical or similar features, characteristics, and aspects. Where appropriate, such as when a chance is significant, a same number is used but with the addition of a letter, such as the letter "A", or "B" or "C". This is done to eliminate redundant discussion, and not for another purpose.

Figure 4:
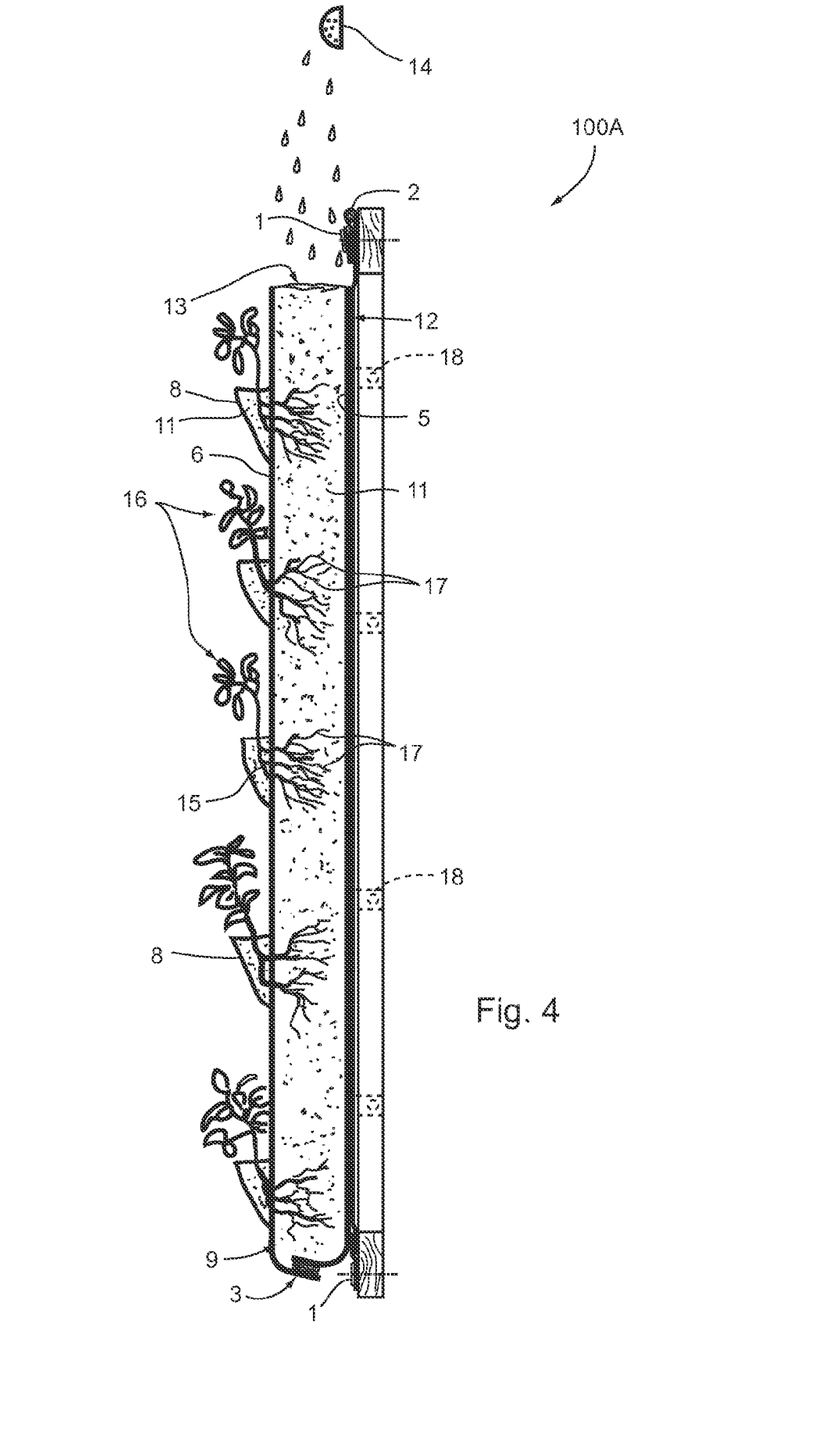
FIG. 4 is a side view of a modified apparatus identical to FIG. 1 but modified by eliminating a vinyl layer (10), which my testing suggests is not required in many applications.

FIG. 4 is a side view of a modified apparatus 100A is identical to apparatus 100 in FIG. 1 but is modified by eliminating a vinyl layer (10), which my testing suggests that the layer 10 is not required in many applications. Instead, in many applications good horizontal water flow may occur across a top of the apparatus 100A even without the layer 10. Notably, the dripper/water distributer 14 provides a good amount of horizontal water distribution. Also, the water flow is timed and sufficiently slow and the growth media sufficiently horizontally "conductive" to achieve the desired horizontal balanced of liquid by the time the water moves downwardly sufficiently to be at a level of the first (top row) of plant roots and the bottom row of plant roots.

Figure 5:
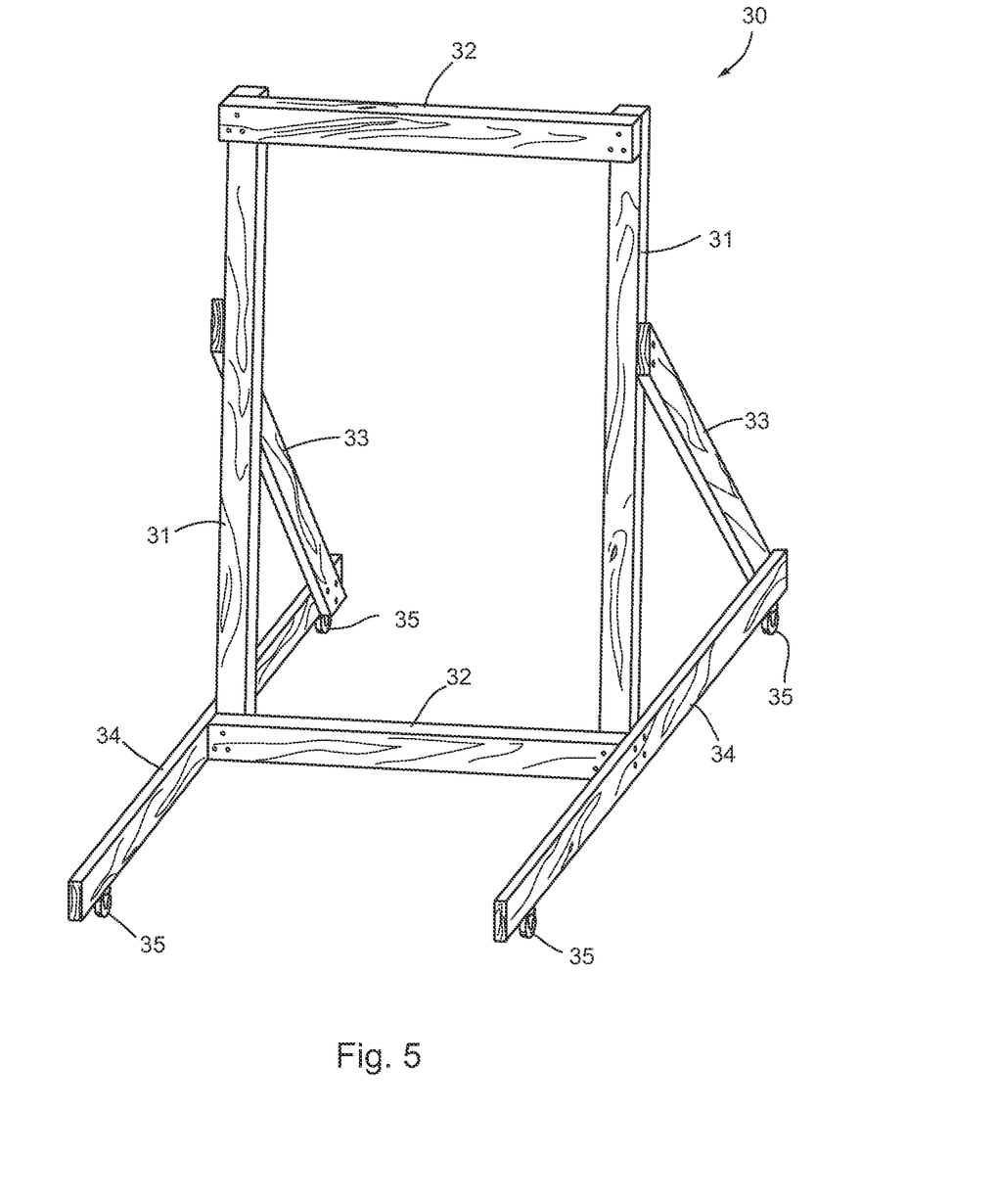
FIG. 5 is a perspective view of portable stand for supporting the apparatus of FIGS. 1 and 4 in a vertical or near-vertical position.

FIG. 5 is a perspective view of portable stand 30 for supporting the apparatus 100 and/or 100A of FIGS. 1 and 4 in a vertical or near-vertical position. Specifically, the illustrated stand 30 includes vertical beams 31 (at least at the edges, and potentially also at intermediate locations), horizontal beams 32, angled braces 33, and lower horizontal base beams 34 that support beams 31-33 and include wheels 35. For example, the beams 31-34 can be 2×4 wood product, or other materials of sufficient strength and durability and connectability. It is contemplated that the wheels 35 can be fixed axle or steerable, and even that the steerable wheels can be attached to a tongue for interconnection to adjacent stands 30 for transport as a "train of carts" behind a tractor, as described below in regard to FIG. 9.

Figure 6:
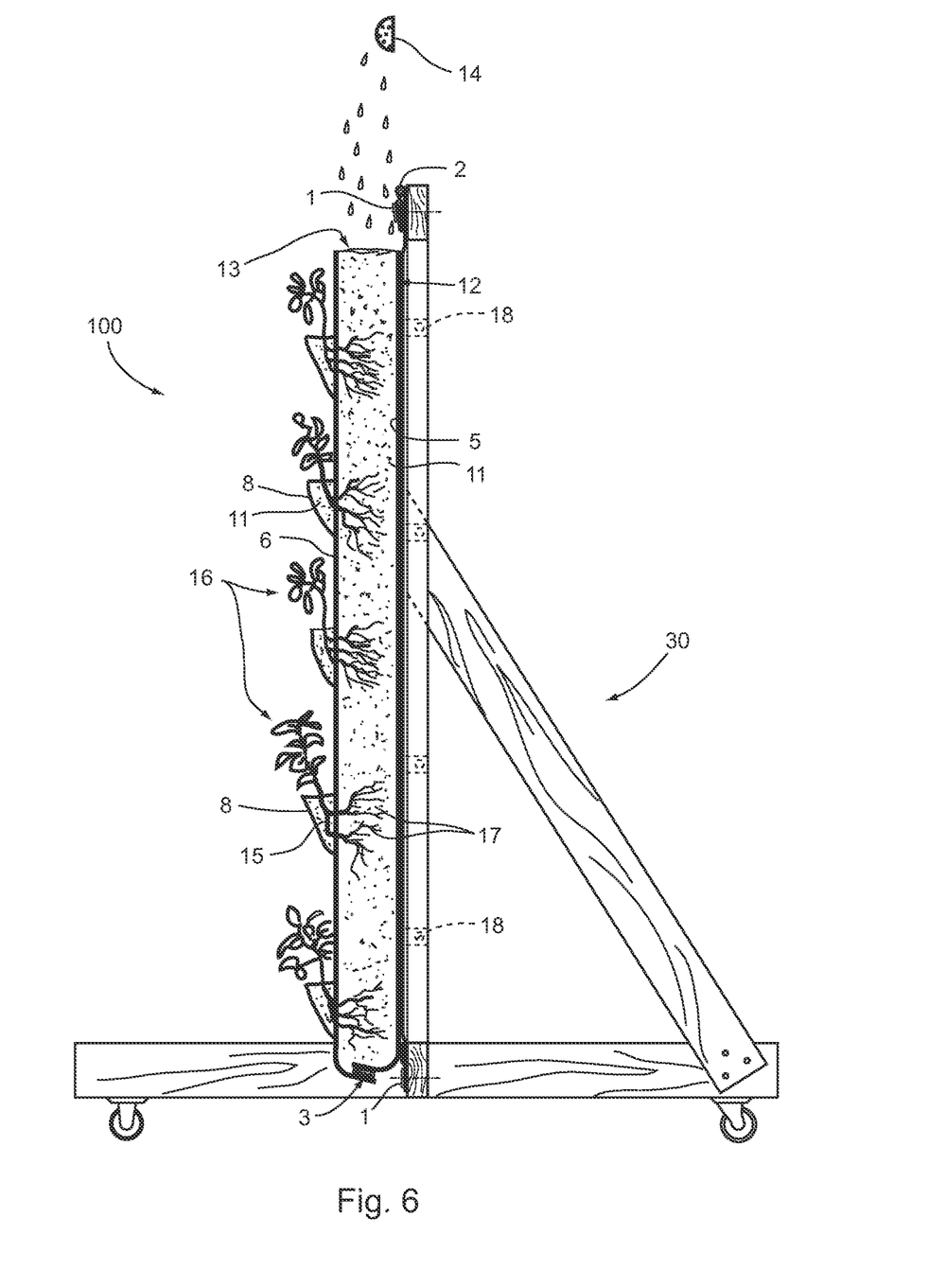
FIG. 6 is a side view of the apparatus in FIG. 4 supported vertically on the stand of FIG. 5.
Figure 7:
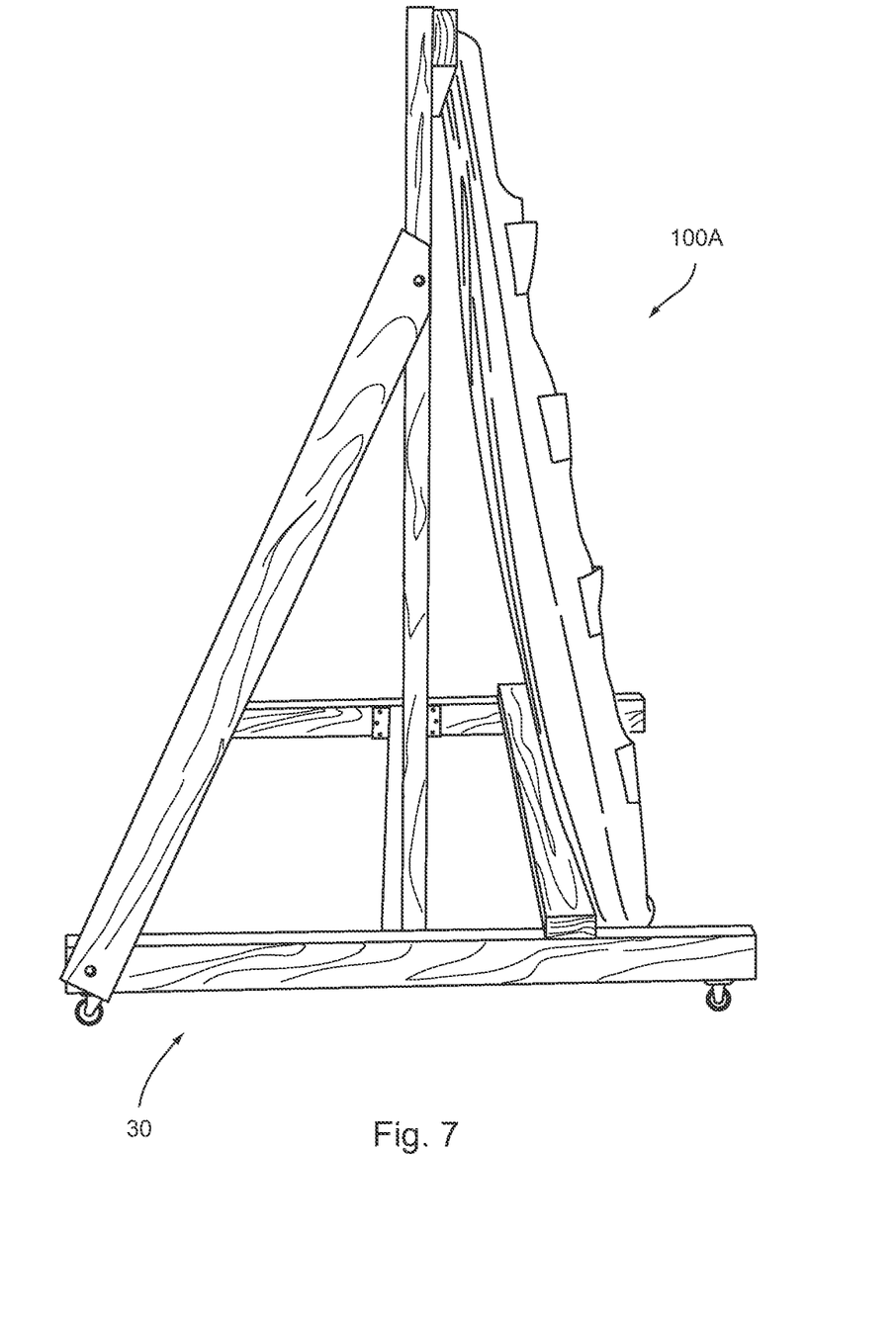
FIG. 7 is a side view of the apparatus in FIG. 4 supported at a slight angle to vertical on the stand of FIG. 5.

FIG. 6 is a side view of the apparatus 100A in FIG. 4 supported vertically on the stand 30 of FIG. 5. FIG. 7 is a side view of the apparatus 100A in FIG. 4, similar to FIG. 6, but with the apparatus 100A supported at a slight vertical angle relative to the upright parts of the stand of FIG. 5.

Figure 8:
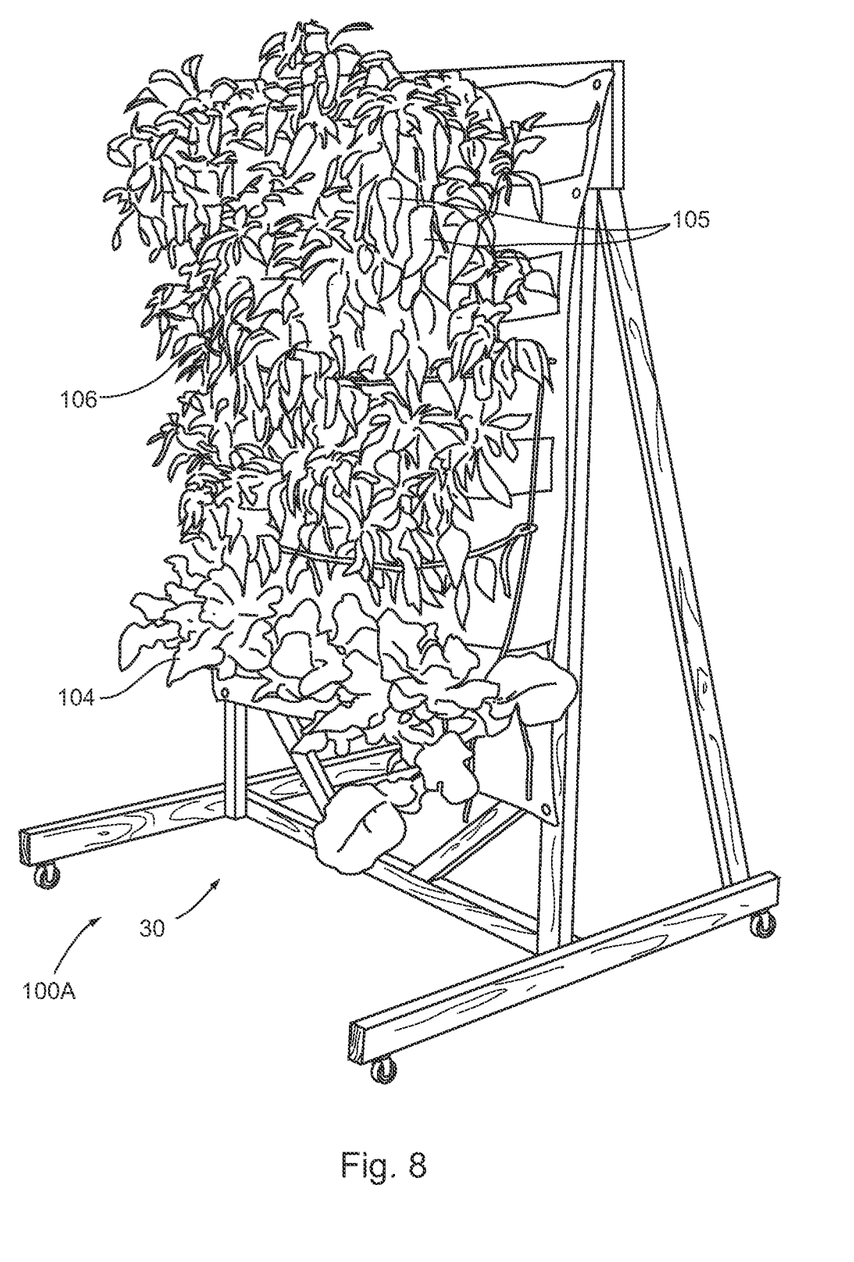
FIG. 8 is a perspective view of the apparatus of FIG. 6, with broccoli growing in a lower layer and peppers growing in a higher level.

FIG. 8 is a perspective view of the apparatus 100A of FIG. 6, with broccoli 104 growing in a lower layer and peppers 105 growing in higher levels. Also, FIG. 8 shows the cordage 106 supporting a weight of the plants 104 and 105, thus allowing the plants to be more densely spaced and to grow larger without their own weight pulling them out of the growth media.

Figure 9:
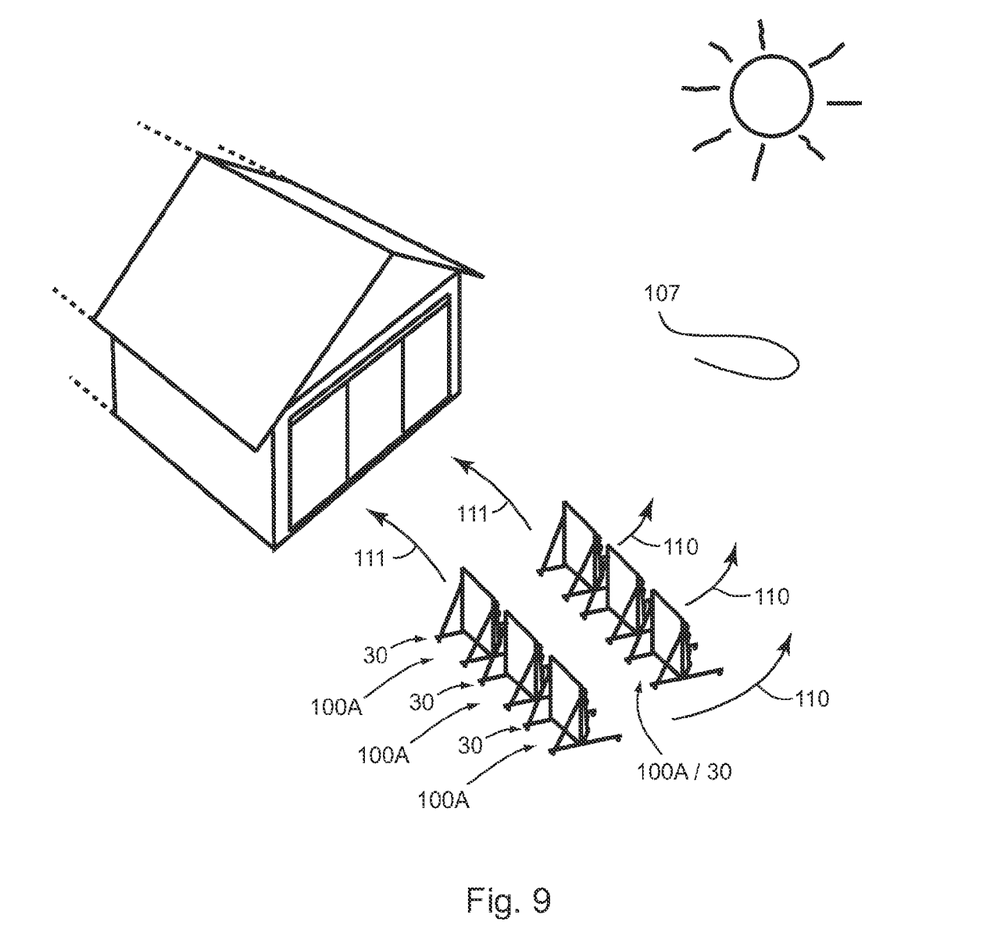
FIG. 9 is a perspective view showing multiple apparatus of FIG. 6 arranged to receive optimal sunlight, including angularly moving the stands to continue to receive optimal sunlight throughout the day, and showing an advantage of portability allowing the system to be stored in a shed at night to avoid frost and low temperatures.

FIG. 9 is a perspective view showing multiple apparatus 100A on portable stands 30 of FIG. 6 arranged to receive optimal sunlight. Notably, the portable stands 30 allow the apparatus 100A to be adjusted angularly (see arrows 110) during the day so that a face of the apparatus 100A continues to receive a maximum or optimal amount of sunlight 107 throughout the day. Also, FIG. 9 shows an advantage of the portability offered by the stands 30, which allows the entire system of apparatus 100A/30 to be moved (see arrows 111) as a "train of carts" by a tractor into a shed 108 where they are stored (or into another enclosure or wind-shielding structure). This would typically be done at night to avoid frost and low temperatures, or during severe weather, to avoid wind and/or other weather-related damage. It is noted that the apparatus 100A with stands 30 can be linked together by chains and/or tongues and/or with other links, such that they can be moved as a long train by a tractor or other powered or automated implement.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A gardening system using materials selected from hydroponic, aeroponic, and geoponic materials in a system for concentrated growing of vegetables in a vertical or near vertical arrangement, comprising:
   a back sheet;
   a geo engineered and industrial first fabric attached to the back sheet and forming a plurality of continually open vertical root-growing channels extending top to bottom on the back sheet filled with a first growing medium; and
   a plurality of horizontal strips of second fabric each extending across multiple ones of the channels in the first fabric and forming envelopes on a front of the channels, the first fabric forming a back side of the envelopes, the first fabric forming a back side of the envelopes, the envelopes being filled with a second growing medium and functioning as a seed germination and seedling nursery.

2. The gardening system of claim 1 including a watering system mounted overhead for dropping water onto a top of at least the channels.

3. The gardening system of claim 1 wherein the root growing channels have an open upper end and releasable-but-closed lower end to facilitate exchange of the growing medium.

4. The gardening system of claim 1 wherein the first fabric is a geo fabric and forms a wall which requires roots of the plants in the envelopes to penetratingly grow through the wall into the channels resulting in root anchorage.

5. The gardening system of claim 1 including plants of at least 3 inches height growing in the envelopes and that can be selectively removed in order to screen the plants based on natural selection and plant intelligentsia.

6. The gardening system of claim 1 wherein the first and second fabrics are constructed of materials based on uniform moisture transfer across and downward of the system.

7. The gardening system of claim 1 wherein the first and second fabrics can be folded and rolled for dense storage and shipping.

8. The gardening system of claim 1, including a plurality of low cost components that mechanically releaseably attach portions of the first and second fabrics together, thus providing a system that is affordable, easy to understand, operate and install.

9. The gardening system of claim 1, including a portable stand supporting the first and second fabrics vertically.

10. The system defined in claim 1, wherein the first fabric is continuous and separates the envelopes from the channels to thus form a root barrier that prohibits seedlings with weak roots from extending from the envelopes into the channels.

11. The system defined in claim 1, wherein the first fabric is continuous and without openings to thus separate the envelopes from the channels and thus form a root anchor for seedlings having roots in the envelopes penetrating through the first fabric into the channels.

12. The system defined in claim 1, wherein the first fabric forms a continuous barrier that separates the pockets from the vertical channels so that the seedlings have roots that penetrate and grow through the first fabric to access nutrients in the vertical channels; the back sheet, first fabric, and second fabric forming a combined system that can be rolled up and shipped prior to being filled with growing medium.

13. A vertical gardening system comprising:
at least two sheets of material hung generally vertically and attached together to form separate vertical channels with each of the channels extending top to bottom of the at least two sheets;
horizontal strips of second material each forming at least two upwardly-open individual pockets on a front side of the at least two sheets of material with one of the at least two sheets being geosynthetic material forming a wall separating the channels and pockets; and
growing medium located in both the channels and the pockets.

14. The system of claim 13, including plants in the pockets having roots penetratingly extending through the geosynthetic material into at least one of the channels with the roots being anchored by the geosynthetic material.

15. The system of claim 13, wherein the pockets are spaced both vertically and horizontally apart.

16. The system of claim 13, including a drip-type watering system feeding water to a top of the channels.

17. The system of claim 13, wherein the strips are continuous and extend a width of the geosynthetic material.

18. The system of claim 17, including releasable attachments for opening and closing ends of the channels to facilitate removal and replacement of the growing medium.

19. The system of claim 13, including plants growing in the pockets and having roots extending penetratingly through the geosynthetic material into the channels, where the geosynthetic material stabilizes the roots and provides root anchorage to plants growing.

20. The system of claim 13, wherein the at least two sheets are selected from sheet material having a thickness of less than ¼ inch.

21. The system of claim 13, wherein the at least two sheets hang vertically in a generally planar condition and do not include horizontal folds.

22. The system of claim 13, wherein the at least two sheets and all components attached thereto can be folded, rolled and thus are easy to ship and store.

23. The system of claim 13, including a stand supporting the at least two sheets vertically.

24. A vertical gardening system comprising:
a plurality of stands, each having wheels at corners for rolling transport;
links interconnecting the plurality of stands for movement as a long train by a powered implement, thus facilitating moving the plurality of stands from a growing area to a protected area;
at least one sheet of geosynthetic material hung generally vertically on each stand and forming vertical channels on one side and upwardly-open pockets on another side both filled with growing medium; and
plants having an above-ground portion extending above the pockets and roots extending from the pockets penetratingly through one of the at least one sheet into the channels, such that the roots are anchored in the one sheet during transport.

25. A method comprising:
providing a plurality of stands, each stand supporting at least one sheet of geosynthetic material hung generally vertically and forming vertical channels on one side and pockets on another side both filled with growing medium;
growing plants having an above-ground portion extending above the pockets and roots extending from the pockets penetratingly through the at least one sheet for anchorage and extending into the channels; and
moving the stand to promote plant growth, including moving the stand between a first location of optimal sunlight and a second location inside protected storage where the plants have protection against freezing.

26. A method comprising:
providing a stand and supporting on the stand at least one sheet of geosynthetic material hung generally vertically and forming vertical channels on one side and pockets on another side both filled with used growing medium, and including a releasable fastener at a bottom of each vertical channel;
growing plants having an above-ground portion extending above the pockets and roots extending from the pockets penetratingly through the at least one sheet for anchorage and extending into the channels; and
replacing the growing medium by opening a bottom of the channels to dump the used growing medium, closing the bottom, and then automatically passing new growing medium into a top of each of the channels.

27. A gardening system using materials selected from hydroponic, aeroponic, and geoponic materials in a system for concentrated growing of vegetables in a vertical or near vertical arrangement, comprising:
- a geo engineered and industrial first fabric with a plurality of continuous top-to-bottom vertical root-growing channels on a back side of the sheet filled with a first growing medium;
- a second fabric on a front side of the first fabric and forming envelopes on the front of the channels; the envelopes being filled with a second growing medium and functioning as a seed germination and seedling nursery;
- vegetables growing in several of the envelops with stronger roots of some of the vegetables having grown penetratingly through the first fabric in a manner that anchors the stronger roots and also others of the vegetables having weaker roots unable to penetrate the first fabric for nutrients from the first growing medium in the channels.

* * * * *